United States Patent [19]

Frankel et al.

[11] Patent Number: 5,140,523
[45] Date of Patent: Aug. 18, 1992

[54] NEURAL NETWORK FOR PREDICTING LIGHTNING

[75] Inventors: Donald S. Frankel, Needham; James S. Draper, Newton, both of Mass.

[73] Assignee: Ktaadn, Inc., Newton, Mass.

[21] Appl. No.: 628,695

[22] Filed: Dec. 14, 1990

Related U.S. Application Data

[63] Continuation-in-part of Ser. No. 402,842, Sep. 5, 1989, abandoned.

[51] Int. Cl.⁵ .............................................. G06F 15/18
[52] U.S. Cl. ..................................... 364/420; 395/22; 395/931; 340/601
[58] Field of Search ........................ 364/513, 807, 420; 324/72; 73/170 R; 340/421, 601; 395/22, 931

[56] References Cited

U.S. PATENT DOCUMENTS

| | | |
|---|---|---|
| 3,428,890 | 2/1969 | Peck et al. .............................. 324/61 |
| 3,465,245 | 9/1969 | Fischer et al. ......................... 324/72 |
| 3,603,951 | 9/1971 | Bracken et al. ....................... 340/224 |
| 3,611,365 | 10/1971 | Lundqust et al. .................... 340/421 |
| 3,753,117 | 8/1973 | Downing et al. ..................... 325/364 |
| 3,820,095 | 6/1974 | Wojtasinski et al. ................. 340/200 |
| 4,095,221 | 6/1978 | Slocum ................................. 340/421 |
| 4,422,037 | 12/1983 | Coleman ................................ 324/72 |
| 4,506,211 | 3/1985 | Coleman ................................ 324/72 |
| 4,594,543 | 6/1986 | Ericsson et al. ....................... 324/72 |
| 4,672,305 | 6/1987 | Coleman ................................ 324/72 |
| 4,812,825 | 3/1989 | Kennedy et al. ...................... 340/601 |
| 4,823,228 | 4/1989 | Bittner .................................. 361/218 |
| 4,965,725 | 10/1990 | Rutenberg ........................... 364/413.1 |

FOREIGN PATENT DOCUMENTS

| | | |
|---|---|---|
| 57-173777 | 10/1982 | Japan . |
| 58-76790 | 5/1983 | Japan . |
| 58-76791 | 5/1983 | Japan . |
| 58-76792 | 5/1983 | Japan . |
| 58-76793 | 5/1983 | Japan . |
| 59-108890 | 6/1984 | Japan . |
| 60-135886 | 7/1985 | Japan . |
| 1-173894 | 7/1989 | Japan . |

Primary Examiner—Allen R. MacDonald
Attorney, Agent, or Firm—Bromberg & Sunstein

[57] ABSTRACT

A system and method are provided for the automated prediction of lightning strikes in a set of different spatial regions for different times in the future. In a preferred embodiment, the system utilizes measurements of many weather phenomena. The types of measurements that can be utilized in approximately the same geographical region as that for which the strike predictions are made. This embodiment utilizes a correlation network to relate these weather measurements to future lightning strikes.

28 Claims, 12 Drawing Sheets

|  | OBSERVED ALTERNATIVE | |
|---|---|---|
| PREDICTED ALTERNATIVE | YES | NO |
| YES | A<br>$P(Y|y)$<br>HIT | B<br>$P(N|y)$<br>MISS |
| NO | C<br>$P(Y|y)$<br>FALSE ALARM | D<br>$P(N|n)$<br>CORRECT REJECTION |

$P(Y|y) + P(N|y)=1$ AND $P(Y|n) + P(N|n)=1$

FIG.8

| TIMING DATA | | PREDICTOR DATA (WEATHER CONDITIONS) | | | | | | | | | | | | | TARGET DATA (RESULTANT STRIKES) | | | |
|---|---|---|---|---|---|---|---|---|---|---|---|---|---|---|---|---|---|---|
| | | WEATHER SENSOR ARRAY | | | | | | | | | | | | WEATHER REGIME | LIGHTNING STRIKES | | | |
| | | WINDS (M/SEC.) | | | | | | FIELDS MILLS (V/m) | | | | CLOUD TOPS (km) | | | SPATIAL LOCATION | | | |
| DAY | TIME LST | 1 | | 2 | | ... | | | | | | | | | TYPE ID | TILE 1 | TILE 2 | ... | TILE 16 |
| | | N | S | N | S | N | S | 1 | 2 | 3 | ... | 1 | 2 | 3 | ... | | | | |
| 310 | ... | | | | | | | | | | | | | | | NE | 0 | 0 | 0 |
| 310 | 0815 | | | | | | | | | | | | | | | NE | 0 | 2 | 0 |
| 310 | 0820 | | | | | | | | | | | | | | | NE | 1 | 4 | 0 |
| 310 | 0825 | | | | | | | | | | | | | | | NE | 3 | 1 | 0 |
| 310 | ... | | | | | | | | | | | | | | | NE | 0 | 0 | 0 |
| 311 | 1035 | | | | | | | | | | | | | | | NE | 0 | 0 | 0 |
| 311 | 1040 | | | | | | | | | | | | | | | NE | 0 | 0 | 0 |
| 311 | 1045 | | | | | | | | | | | | | | | NE | 0 | 0 | 0 |
| 311 | 1050 | | | | | | | | | | | | | | | NE | 0 | 0 | 0 |
| 311 | 1055 | | | | | | | | | | | | | | | NE | 0 | 0 | 0 |
| 312 | 1550 | | | | | | | | | | | | | | | SW | 21 | 14 | 4 |
| 312 | 1555 | | | | | | | | | | | | | | | SW | 32 | 29 | 7 |
| 312 | 1600 | | | | | | | | | | | | | | | SW | 15 | 17 | 16 |
| 312 | 1605 | | | | | | | | | | | | | | | SW | 2 | 3 | 11 |
| 312 | 1610 | | | | | | | | | | | | | | | SW | 0 | 0 | 3 |

FIG.10

| TIMING DATA | | PREDICTOR DATA (WEATHER CONDITIONS) | | | | | | | | | | | | | |
|---|---|---|---|---|---|---|---|---|---|---|---|---|---|---|---|
| DAY | TIME LST | WEATHER SENSOR ARRAY | | | | | | | | | | | | WEATHER REGIME TYPE ID | UNUSED BLOCKS FOR STRIKE DATA |
| | | WINDS (m/SEC.) | | | | | | FIELDS MILLS (V/m) | | | | CLOUD TOPS (km) | | | |
| | | 1 | | 2 | | ... | | | | | | | | | |
| | | N | S | N | S | N | S | 1 | 2 | 3 | ... | 1 | 2 | 3 | ... | | |
| 310 | ... | | | | | | | | | | | | | | | NE | |
| 310 | 0815 | | | | | | | | | | | | | | | NE | |
| 310 | 0820 | | | | | | | | | | | | | | | NE | |
| 310 | 0825 | | | | | | | | | | | | | | | NE | |
| 310 | ... | | | | | | | | | | | | | | | NE | |
| 311 | 1035 | | | | | | | | | | | | | | | NE | |
| 311 | 1040 | | | | | | | | | | | | | | | NE | |
| 311 | 1045 | | | | | | | | | | | | | | | NE | |
| 311 | 1050 | | | | | | | | | | | | | | | NE | |
| 311 | 1055 | | | | | | | | | | | | | | | NE | |
| 312 | 1550 | | | | | | | | | | | | | | | SW | |
| 312 | 1555 | | | | | | | | | | | | | | | SW | |
| 312 | 1600 | | | | | | | | | | | | | | | SW | |
| 312 | 1605 | | | | | | | | | | | | | | | SW | |
| 312 | 1610 | | | | | | | | | | | | | | | SW | |

FIG.11

NEURAL NETWORK FOR PREDICTING LIGHTNING

The U.S. Government has a paid-up license in this invention and the right in limited circumstances to require the patent owner to license others on reasonable terms as provided for by the terms of contract No. F19628-89-C-0012 awarded by the Geophysics Laboratory, Air Force Systems Command, United States Air Force.

CROSS-REFERENCE TO RELATED APPLICATIONS

This application is a continuation-in-part of patent application Ser. No. 07/402,842, filed Sep. 5, 1989, abandoned which is hereby incorporated herein by reference.

TECHNICAL FIELD

This invention relates to the automated prediction of lightning strikes. More particularly it relates to the processing of the output of different types of weather measurement sensors for the training, testing and usage of the correlator networks that, using current outputs of a similar set of weather sensors, for providing predictions of future severe weather activity.

BACKGROUND OF THE INVENTION

Devices which automatically predict lightning strikes that are based on local measurements of wind conditions are not known to the art. There are different technologies using different data and giving different types of results.

One alternative system utilizes projections of the future motion of storm cells. Lightning monitoring systems, which report the location of strikes, project the future location of thunderstorm cell clouds based upon current and anticipated future motion of storms. A limitation of this method is that the thunderstorm may have dissipated or changed its course before the predicted time.

Another alternative system is based upon the measurement of wind convergence to indicate the likelihood of future strikes. Wind convergence has been applied to a very wide region with strikes predicted to occur at unspecified locations somewhere within the entire region at an unspecified time in the near future. The performance figures of this method are systematically lower than those of the invention since the invention utilizes the entire wind field as input rather than a specialized product of the wind field, the convergence. Further, the wind convergence method is not automated and is not specific to predictions of lightning strikes in a set of different spatial regions at different times in the future. This method is also not improvable by retraining from data currently being collected from the same instrument array used to make predictions.

DISCLOSURE OF THE INVENTION

The invention allows the user to arrange the physical locations of the weather sensors to their convenience as the device the person uses automatically accommodates sensor location to the input of the lightning prediction correlation network. The invention relates to a device that allows such weather data to be used for training and, generally, improving the lightning predictor performance when that person is not skilled in computer programming.

In a preferred embodiment, the present invention may be used to predict lightning strikes for different locales by allowing the user to train the correlation network using the same weather sensors (located in the same place) that are used during routine prediction of lightning strikes.

In a preferred embodiment, the present invention allows the user to improve the performance of the lightning predictor by intermittent retraining sessions between routine lightning prediction periods. Since most lightning strikes occur after noon, retraining can be programmed to take place automatically in the evening or morning. Therefore, training will not interfere with routine operation and adding to the utility of the present invention. In this embodiment, the present invention allows the user to make substantial changes in the computer program (instruction stream) of the correlation network without having to know what detailed changes are required nor how to program computers. This is accomplished through interactions with the monitor screen, menus and windows and mouse and keyboard.

In a further embodiment, the present invention allows the user to make quantitative comparisons of the performance of different networks using different training and testing data sets. The comparisons are available in the form of cross-plots of observed vs. predicted lightning strikes (i.e. contingency tables) and other accepted measures of performance such as probabilities of detection and false alarm rates.

The present invention provides, in one embodiment, a system and method for predicting lightning strikes at each of M spatial 'tiles' for each of N times into the short-term future. For example, a spatial region 20 miles on a side can be divided into 16 square 5×5 'tiles' and four divisions of the short-term future can be defined as follows: (1) now to 15 minutes in the future, (2) 15 to 30 minutes in the future, (3) 30 to 60 minutes in the future, and (4) 60 to 120 minutes in the future.

The invention includes an array of sensors for collecting weather data and for detecting the occurrence of lightning in the given area. The sensors may include a plurality of anemometers, located at plurality of locations, for determining wind speed an direction. The sensors may also include electric field sensors for detecting the presence of charged clouds, doppler radar for detecting precipitation, and/or an earth-orbiting satellite, which may be used to determine the heights of nearby clouds as well as gather other useful information. The sensors preferably include direction-finding radio antennas for determining he location of lightning. Acoustic receivers for mapping thunder and optical measures of lightning flashes may also be used. Based on the information gathered from these sensors in the past (including, in one embodiment, information regarding the overall weather pattern), a processor determines correlations between the weather data collected at given times in the past and the occurrence of lightning in the given area. The processor may then determine the probability of an occurrence of lightning in the given area at some future time, based on weather data presently being collected and the correlations determined from the weather data collected in the past.

In a preferred embodiment of the invention, a processor based on a neural-network system (preferably a back-propagation neural-network system) is used to determine the correlation between the weather data and lightning strikes. The network coefficients (i.e., link weights) used by the processor are determined by "training" the processor based on past weather data and past occurrences of lightning. When properly trained, the processor is able to determine whether lightning is likely, based on the current weather data and the network coefficients that were determined during training.

All the features of the invention will be better understood by reference to the detailed description of the present invention given below in the section "Description of Specific Embodiments" when taken together with the accompanying drawings.

BRIEF DESCRIPTION OF THE DRAWINGS

FIG. 8 shows a stimulus-response matrix for evaluating networks.

FIG. 10 shows a format for training and testing data sets used in processors II and III.

FIG. 11 shows a format for current data sets used in processor IV.

DESCRIPTION OF SPECIFIC EMBODIMENTS

Figure 1:
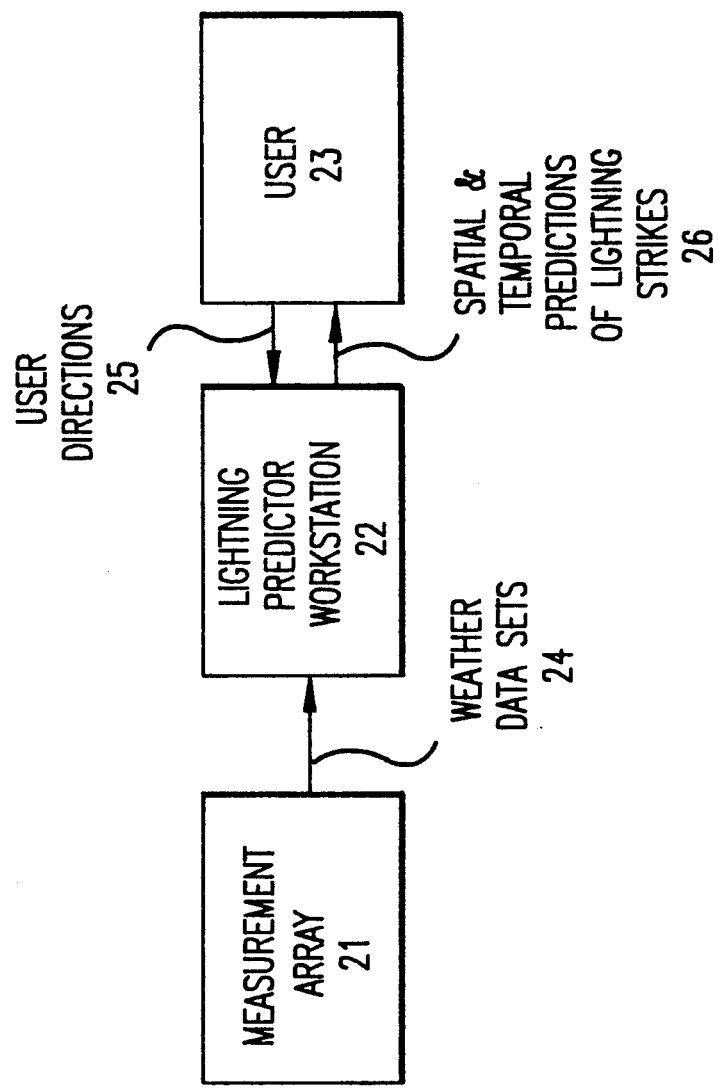
FIG. 1 shows a schematic of a typical layout of the invention.
Figure 2:
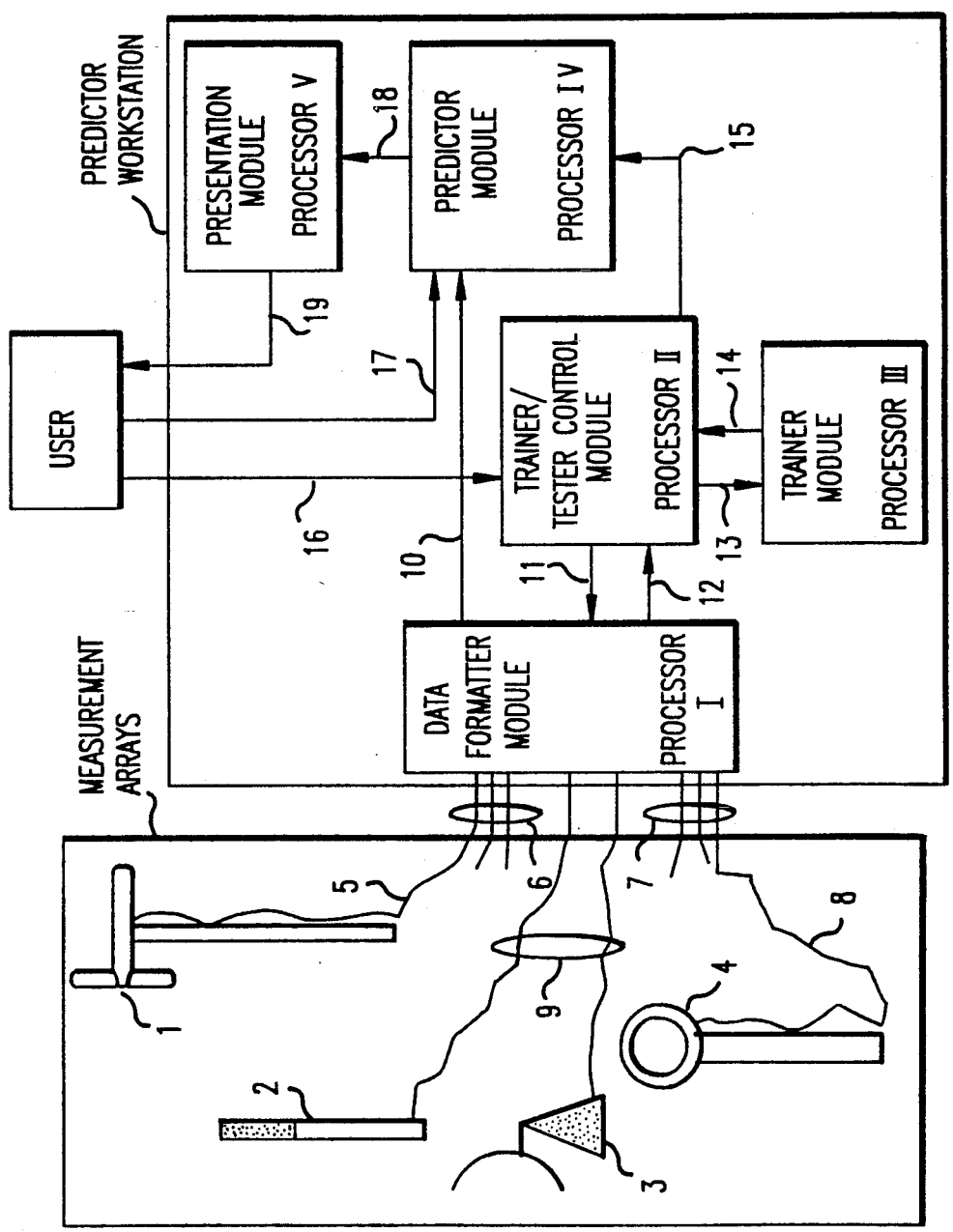
FIG. 2 shows a schematic of a preferred embodiment of the invention.
Figure 12:
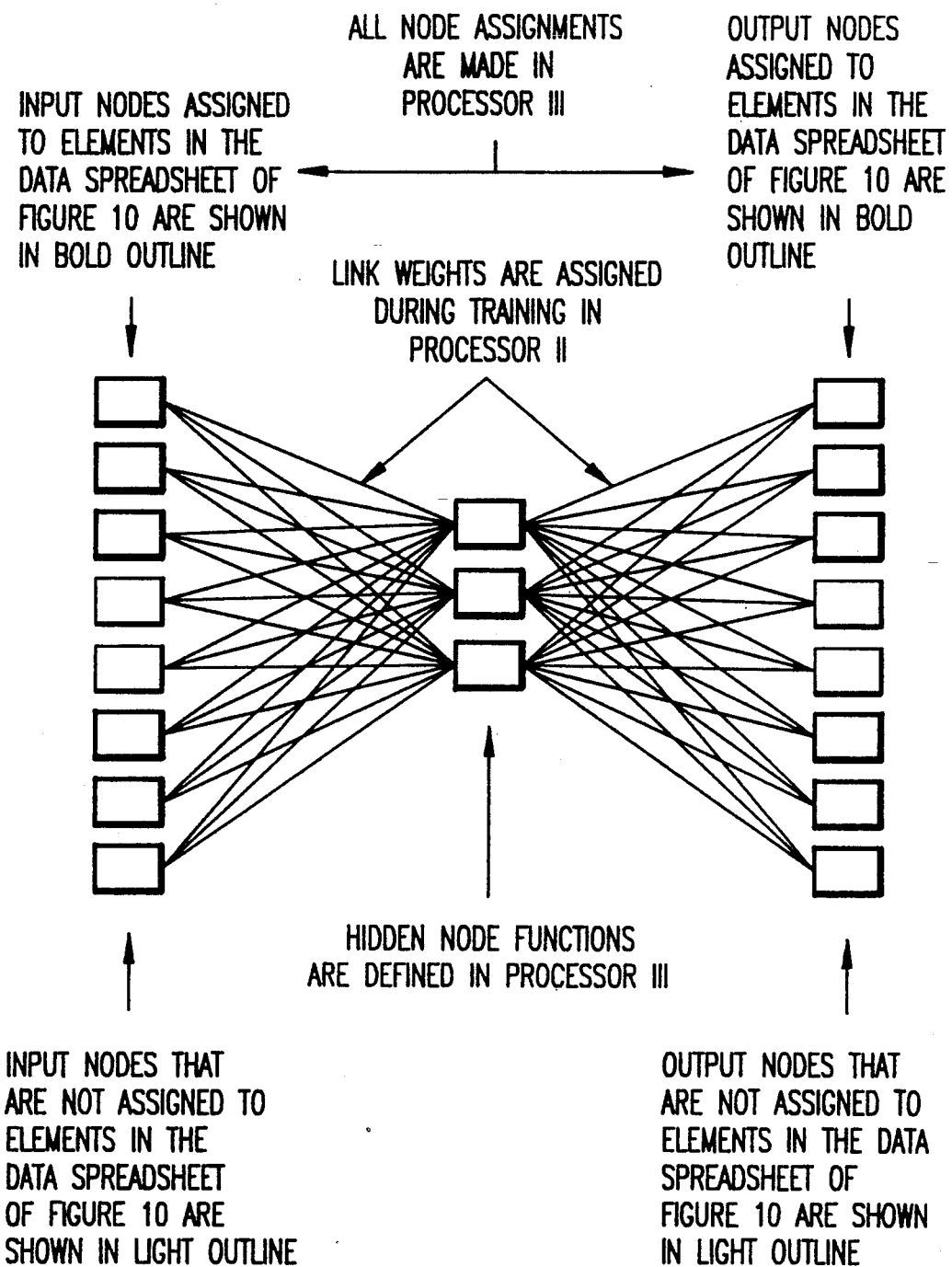
FIG. 12 shows a backpropagation type of neural network layout that may be assigned in processor III.

The principal parts of the present invention are shown in FIG. 1. The physical layout, inputs and outputs and each processing element of a preferred embodiment of the present invention are shown in FIG. 2. The 'Data Formatter Module,' termed 'processor I,' is shown with data preprocessing, user instruction buffers, formation of training and testing sets and buffers for these data sets in the flow chart in FIG. 3. The 'Trainer/Tester Control Module,' termed 'processor II,' is shown with buffers for selected training and testing data sets, network training set up, testing procedures and user criteria for testing as a flow chart in FIG. 4. The 'Trainer Module,' termed 'processor III,' is shown with training data and instruction buffers and the neural network training module as a flow chart in FIG. 5. The 'Predictor Module,' termed 'processor IV,' is shown with current data, prediction requirements and user instruction buffers and neural network classification modules as a flow chart in FIG. 6. The 'Presentation Module,' termed 'processor V,' presentation output is shown schematically in this figure. This module converts current predictions and user presentation requirements into the type of graphic presentation such as is shown in FIG. 7. The scoring of the quality of the Lightning Predictor performance is evaluated using a 'contingency table' as is shown in FIG. 8. Related to the 'contingency table' of FIG. 8 is the ROC (receiver operating characteristics) diagram of FIG. 9. An example of the format for the weather data sets used in testing and training is shown in FIG. 10. An example of the format for the current weather data sets used in predicting future lightning strikes is shown in FIG. 11. An example of the neural network layout for assignment of input and output nodes to weather set and predicted lightning (by tile and time) is shown in FIG. 12.

In FIG. 1, the weather sensors (e.g., for collecting surface wind speeds and direction, electric field intensities, cloud altitudes and the location and timing of lightning strikes) are provided by the Measurement Array 21. These data are sent as weather data sets, as signal 24, to the Predictor Workstation 22. The Predictor Workstation is a processor. This processor, in the form of software on a standard desktop computer, is for the user 23 to direct the manipulation of the weather data and the presentation of options and predictions. Directions from the user are in signal 25 and predictions presented to the user are in signal 26.

The physical layout of the Measurement Array, its inputs to the Predictor Workstation, the inputs and outputs and each processing module in the Predictor Workstation, and the user's interactions are schematically shown in FIG. 2. The next paragraphs address the processor elements I through IV.

The Measurement Array physical layout is composed, in part, of a field of many anemometers 1 which provide the surface wind vectors at those locations. Locating the sampling sensors requires some general considerations: (a) total area covered, (b) total number of sensors needed, and (c) the precise location of sensors within the sampling region. These three sensor location issues are considered next. A location may be different either by its map coordinates (i.e. latitude and longitude) or its height above a pair of stated map coordinates. The user must locate the weather sensors over a physical region of an extent about twice that of the area for which the user wishes to predict lightning strikes. For example, if one wishes to predict lightning for a 10×10 square cluster of four 5×5 mile squares, one would locate anemometers over the surrounding 20×20 mile region. One requires only representative samples of the winds in the 20×20 mile region. Hence the total number of anemometers needed would be about 1 or 2 per 5×5 mile regions. This means a total of 16 to 32 anemometers would suffice. Another issue encountered in laying out the anemometers is their precise location. A primary feature of the present invention is that, by using adaptive neural networks, the details of the anemometer physical layout are not required to be regular (e.g., as at points on a rectangular grid) since the training cycle automatically adapts the lightning predictor to the differences in location. The critical task is to assure that the same physical layout is used during training, testing and routine prediction of lightning strikes. The output of an anemometer in the field array is carried to the Data Formatter Module (processor I) by a cable 5. Alternatively, the anemometer signals could be conveyed to the processor by radio or other non-contact communication links. In any event, all the anemometer signals are combined in a bundle at the input 6 of the Predictor Workstation that carries all sampled wind velocities and directions coded by anemometer location.

Other weather sensors are included in the measurement array. The measurement array is composed, in addition to the anemometers, of an array of lightning locator DF antennas 4, which provide the location, timing and strength of all lightning strikes at different locations over the general area covered by the weather measurement array (at least covering the intended prediction area). The outputs of the lightning locator DF (radio 'direction finding') antennas are carried into processor I by a series of cables (8 in FIG. 2). Alternatively, the lightning locator DF antenna signals could be conveyed to the processor by radio or other non-contact communication links. In any event, the signals are combined in a bundle at the input of the Predictor Workstation (the set of inputs shown by 7 in FIG. 2) that carries all observed lightning strikes coded by DF antenna location.

The physical layout of weather sensors can include other types of weather sensors, in addition to the anemometers and DF antennae already discussed, which are known to respond to the approach of charged clouds which are the source of lightning strikes. For example, electric field mills 2 for measuring the local vertical electric field intensity, doppler radars 3 for measuring precipitation and satellite measurements of thunderstorm cloud tops and rates of growth are all easily adapted to the lightning predictor when these kinds of sensors are available. The signals from such additional weather sensors are collected (the set of inputs 9) at the input of the Predictor Workstation to carry all observed electrical field intensities and precipitation areas by weather sensor location.

Figure 3:
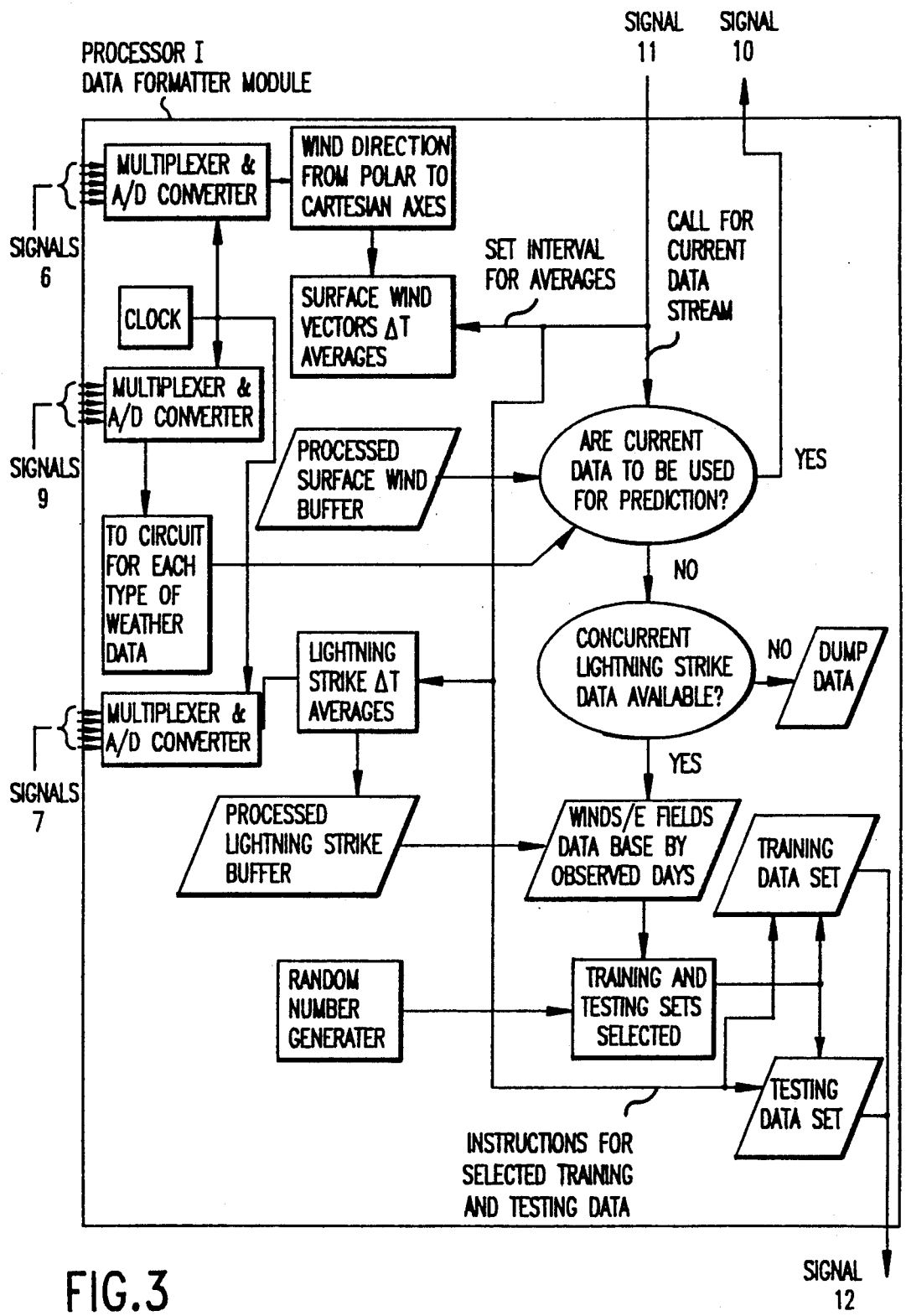
FIG. 3 shows a schematic of the data formatter module, processor I.

The Data Formatter Module is termed here 'processor I' and is shown as a flow chart in FIG. 3. The Data Formatter Module is implemented using standard A/D converters, clocks, storage (e.g. RAM, tape, floppy, hard disk, or CD ROM) and hardware processors. Processor I operates on the field data to reduce (calibrate, check for proper operation, etc.), format, store the weather data. Processor I inputs are from the field data array. Processor I outputs are properly formatted data sets to the trainer/tester and the operational lightning predictor.

Processor I has three types of input. Signals 6, 7 and 9 are fed into preprocessor I where the surface wind, electric field intensity, etc. and lightning strike data are reduced for several uses. These uses are: (i) training new correlation networks, (ii) further training already trained networks, (iii) testing (i) and (ii), and (iv) routine use in the prediction of future lightning strikes. The third type of signal is signal 11 from processor II and it contains instructions or 'calls' for data sets from the data base storage.

In processor I the surface wind data are transformed into a standard format of two orthogonal (north-south and east-west) surface wind vectors measured at standard times (e.g. 5 minute averages recorded every 5 minutes). A sample of the format is shown in FIG. 10 showing both precursor weather measurements (winds, electric field intensities, cloud top altitudes, etc.) and subsequent lightning strikes. This transformation into cartesian coordinates avoids the discontinuity at due north between 0 degrees and 360 degrees in polar coordinates which complicates the neural network training process. The DF antenna variables are transformed into a location on the map coordinates which also show the prediction area of interest with time and amperage of each strike detected. The processor I formats all the wind vector histories and lightning strikes into a spreadsheet format with standard time intervals (e.g., each 5 minutes) giving the wind vectors for each anemometer location and lightning strikes during the same 5 minute interval (if any).

The processor I 'spreadsheet' format of FIG. 10 is divided into 'Observed Days.' This is important as the overall weather pattern (sometimes called the 'synoptic weather' or 'weather regime') can have a strong influence on the correlation network used by the lightning predictor. As a rule, weather patterns tend to hold for several days, and dividing the data sets into Observed Days facilitates associating one type of correlation network with one type of weather pattern (see below for entering 'contextual conditions' into the correlation network training and operational use).

The final function of processor I is the task of creating training and testing data sets. This is carried out by randomly selecting Observed Days into the training and testing sets for later use. Weather regimes tend to control some aspects of the patterns of lightning strikes. Because weather regimes tend to last for periods of days, the weather regime may be measured once a day (e.g., by measuring the direction of surface winds and/or noting the vertical profiles to establish atmospheric stability indices) and is used in building the lightning predictor correlation network to provide a conditioning context for more accurately training the prediction networks.

Processor I has two types of output. The first output in signal 12 is the past record of winds and strikes in a spreadsheet organized as described above and shown in FIG. 10. This output is used for either training or testing correlations networks for the lightning predictor invention presented here. The second output in signal 10 is the current surface wind field record organized as inputs in the format of FIG. 11. This last format provides the data needed for routinely operating correlation network used to predict future strikes. These two uses of the processor I output are described below.

Figure 4:
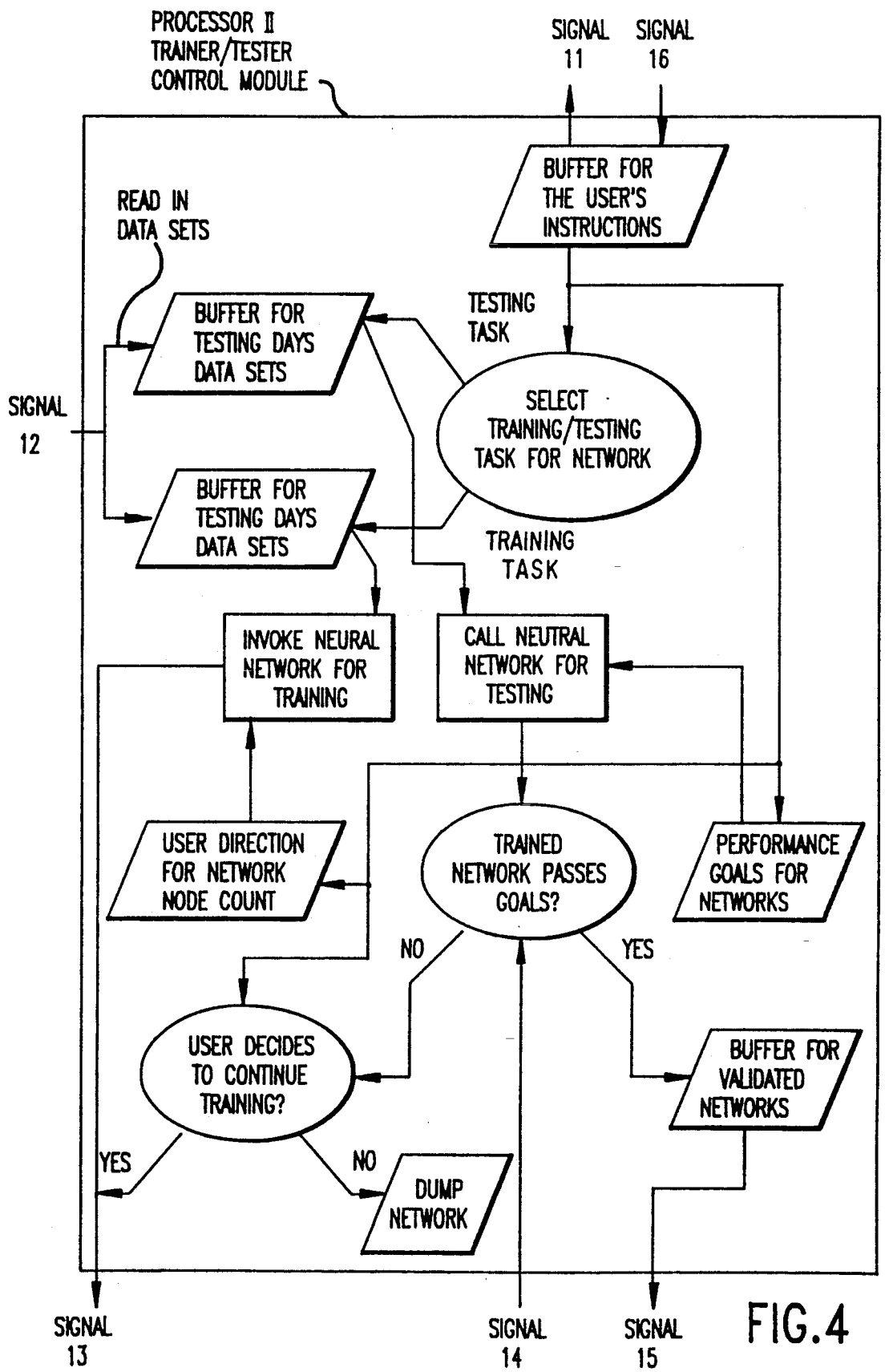
FIG. 4 shows a schematic of the trainer/tester control module, processor II.

The 'Trainer/Tester Control Module,' termed here 'processor II,' is shown in FIG. 4. Processor II operates on user instructions and on formatted data. Processor II has several tasks: to train neural networks (i.e. create new correlation coefficients networks by means of training neural networks), to evaluate the performance of trained correlation networks, to retrain, by means of neural networks, those correlation networks which do not meet the user's perforamnce goals, and to add to the training of already trained networks (which, in the past, passed the user's performance goals) using more recently gathered weather data.

Processor II has three types of input. The first type of input is called from processor I by instructions (signal 11) in processor II and are signals 12 containing properly formatted data sets. The second type of input is the set of user instructions on training and testing obtained through signal 16. These instructions are the basis for the calls made by processor II on processor I which result in the signal 12. The third type of input is the trained network passed to processor II from processor III in signal 14. The outputs of processor II are two types. The first output is a set of training and testing instructions to new and previously trained correlation networks in signal 13 transmitted to the neural network training module as described below as processor III. This type of output is arranged in a spreadsheet type of format as shown in FIG. 10. The second type of output is a validated correlation network for use with current data in lightning prediction, signal 15. This type of output is arranged in a spreadsheet type of format as shown in FIG. 11.

Inside processor II the trained networks are tested or 'validated' against known lightning strikes. Validation is the procedure that compares the neural network predictions against the results in known (empirical) data sets specially chosen for testing (i.e. the testing data sets). Comparison of newly trained network predictions and empirical observations is carried out using contingency tables as are described in the section on "Tables and Variables." The testing logic in processor II, see the lower half of the processor shown in FIG. 4, operates on a newly trained network (from signal 14) with its training history and testing instructions contained in the user instructions buffer which instructions are passed from the user by signal 16.

The user will input to processor II, via the signal 16, the performance criteria which a validated network is expected to meet or exceed. These criteria are given in the form of "minimum PoD" and "Threshold, T." An explanation of these variables and how they are calculated using the trained network is given below. This explanation is based upon a background of the method which is also summarized below.

A 'contingency table' is used for the lightning predictor performance in the present invention. Evaluation of networks in various stages of training can be carried out using a rigorous, well-accepted methodology based upon a 2×2 stimulus-response matrix such as pictured in FIG. 8. By this methodology, known stimuli are row entries and the perceived response options are column outputs. The capital letters (A, B, C, and D) represent the total number of times each type of event occurred. For example, A is the total number of times a lightning stroke occurred in a specific tile in a specific time frame as it was predicted to occur. The conditional probabilities (e.g. P(Y|y)) are shown underneath these total numbers of specific occurrences given by the names underneath the conditional probabilities.

Therefore, the upper left-hand box in FIG. 8 gives the conditional probability of the network responding that lightning will occur when it actually occurred. The lower right-hand box is the conditional probability of the network responding that lightning will not occur in a situation in which it indeed did not occur. A good lightning predictor would have high probabilities in these two boxes. The lower left-hand box is the probability that the network would predict lightning when it did not occur—the probability of a false alarm (PFA). The upper right-hand box is the probability of predicting no lightning when it did occur. A good lightning predictor would have low probabilities in these latter two boxes.

A decision evaluation system can be built on conditional probabilities. P(Y|y), the probability of the system predicting Y given that y is observed. The probability that the decision system response is Y to weather stimuli, y, applies to the period, t to t+dt, and some specified area, da. If Y is not the response we must choose N. For this reason the two equations hold:

$$P(Y|y)+P(N|y)=1 \text{ and } P(Y|n)+P(N|n)=1 \qquad (1)$$

Figure 9:
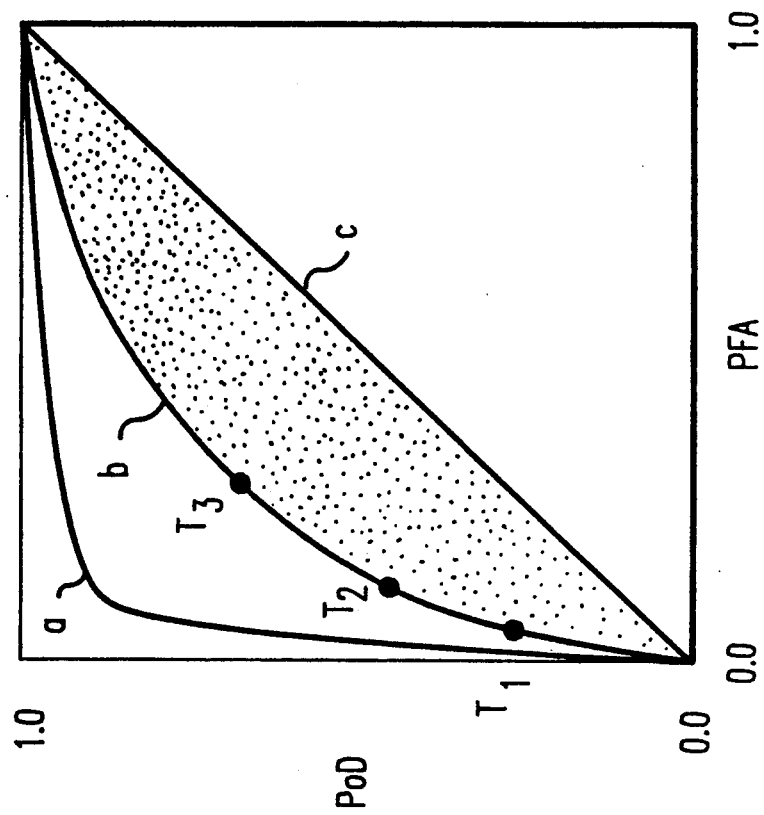
FIG. 9 is a graph depicting the predictor's performance at several thresholds.

Equation 1 allows one to plot all the consequences of the decision making on a two degree of freedom graph, the ROC graph which is pictured in FIG. 9.

In evaluating lightning detection networks the behavior of the output nodes is used as a scoring measure. An output node 'activation' level, a, will vary from 0.1 (event predicted not to happen) to 0.9 (event predicted to happen). A threshold T is adopted for decision making. If the activation level of an output node is greater than T, a>T, the positive prediction Y is declared; otherwise, T>a, a negative prediction N is declared. When evaluating the network, all predictions are compared with the known results (i.e. observations) y and n in a contingency matrix (see FIG. 8) as T varies.

Even in high activity regions, lightning strikes are rare. It is important for the prediction scheme to correctly predict non-lightning events which numerically dominate stroke 'events'. A lightning predictor would have a high overall correct percentage if it always predicted 'no strike'. This is the 'play the winner strategy'. The successful predictor must predict the numbers of lightning events. So while a low false alarm rate is desirable, it is not indicative of predictive power when true alarms are rare.

Measures of performance are adapted based on the following definitions taken from the contingency matrix of FIG. 8 from which the following performance measures can be defined, Probability of Detection, $PoD = A/(A + B)$ (2)
Probability of False Alarm, $PFA = C/(C + D)$ (3)
Miss or Probability of False Dismissal, (4)
$PFS = B/(A + B)$
False Alarm Ratio, $FAR = C/(A + C)$ (5)
Correct Rejection $= D/(C + D)$ (6)

The difference between the Probability of False Alarm PFA defined in Eq. (3) and the False Alarm Ratio FAR in Eq. (5) is significant. The PFA is the conditional probability of (false) positive prediction given that the event was not observed. On the other hand, the FAR is the ratio of false predictions of the event to all predictions of the event. The FAR measure is only sensitive to predictions and is a good measure of the system performance only when false alarms are very undesirable. On the other hand, the PFA is a better measure of the likelihood of the actual events and should be used for decision making.

Two success and skill measures are used. The Critical Success Index (CSI) is a measure of relative accuracy since it shows the ratio of predicted cases vs. both predicted and/or observed cases, $$CSI=A/(A+B+C) \qquad (7)$$

The range of CSI values extends from 0 to 1. CSI differs from FAR and POD because it is sensitive to both false alarms and missed events. To evaluate the performance of the network the Heidke skill score is used. The Heidke skill score values range from $-\infty$ to $+1$. Plus one indicates the perfect score and zero means that the number of correct predictions equals the number of expected correct predictions. Thus the skill "subtracts" the number of correct predictions which would have been obtained merely by chance.

$$Skill=[A+D-(Yy+Nn)/M]/[M-(Yy+Nn)/M] \qquad (8)$$

where M is Total Number of Observations:

$M = A + B + C + D$ (9)
$Y = A + C$ (10)
$N = B + D$ (11)
$y = A + B$ (12)

-continued $$n = C + D \quad (13)$$

The values in the contingency table of FIG. 8 are used to compute conditional probabilities in a receiver operating characteristic (ROC) graph illustrated in FIG. 9. Overall network performance depends on the value of the threshold, T, chosen by the user. If T is large then fewer events will be classified as lightning strikes, decreasing PoD and PFA at the same time. That would be indicated by a point in the lower left side of the ROC graph of FIG. 9. Small T will lead to high false alarm rates in the upper right-hand corner of the graph. For a given network the ROC is a curve between these two extremes. Setting T is the responsibility of the user who must balance the benefit of a correct prediction against the cost of a mistake.

When the probability of detection is equal to the probability of a false alarm the decision-making process is doing no better than it would by guessing. This situation is shown by the straight line c in FIG. 9. For a lightning prediction system, one expects that curve c would be the performance of an untrained network. Increasing levels of training are shown by the curves a and b which move toward the upper left-hand corner of the graph For a given level of training and a series of threshold values ($T_1$, $T_2$, and $T_3$), one can estimate the ROC curve as shown by b in FIG. 9. The integral under the ROC (the shaded area) is a measure of the goodness of a correlation network's performance. For c the shaded area is zero corresponding to chance predictions or 'shooting in the dark'. To find an optimal threshold, $T_0$, the user must estimate the benefits and losses of correct and incorrect predictions, respectively. Having trained a network, one adjusts thresholds until the best balance is struck between these benefits and losses. An important feature of the present invention is that, with the resumption of training, skill level might be incrementally increased at a local observation site. It is important to consider the overall process of retraining and resetting thresholds in the ultimate local user's interface to the Lightning Predictor Workstation.

The scoring of the present lightning predictor contains some elements adapted to the geography and future time intervals of interest as described for the layout of spatial tiles indicated in FIG. 7 and in the discussion of the embodiment of the invention. For each geographical subdivision, the network has been set up to predict lightning activity in four future time windows. Prediction for the interval from the present to 15 minutes in the future is called the 'nowcast.' Predictions for the interval from 15 minutes to 30 minutes is called 'Time ½'; between 30 minutes and 1 hour is 'Time 1'; and between 1 hour and 2 hours is 'Time 2'. Statistics for each prediction window are separately compared with each time in the future.

The scoring system is conservative. In the event that the network predicts lightning activity for 'Time ½' and no lightning stroke occurs in the 'Time ½' window the network scores zero. This is so even if subsequently a lightning stroke occurs for that geographical region at 'Time 1'. Generally, the scoring gives the predictor lower performance scores than were it credited with subsequently observed strikes for any of its time windows as it is penalized for predictions which are 'too early' or 'too late.' Predictions for specific time intervals and tiles are used to construct contingency tables as the basis for comparison with alternative lightning prediction systems. This concludes the explanation of the scoring system in the testing section of processor II of the present invention.

The testing procedure in processor II gives two types of output. One output (signal 15) is a trained network that met or exceeded its performance goals in validation. Validated networks are forwarded to processor IV for routine predictions of future lightning strikes via a buffer for storing validated networks. The second output signal is an untrained network that is forwarded to a user decision point at which the unvalidated network is either passed back to processor III via signal 13 for more training or is erased ('dumped'). The activation of this output path is indicated to the user so as to prevent endless looping of an unsatisfactory network. In sum, once a network has failed, the user is notified and can then issue directions for: (i) further training in processor III, (ii) starting over with a new neural network layout in training a new correlation network, or (iii) changing the performance goals.

Figure 5:
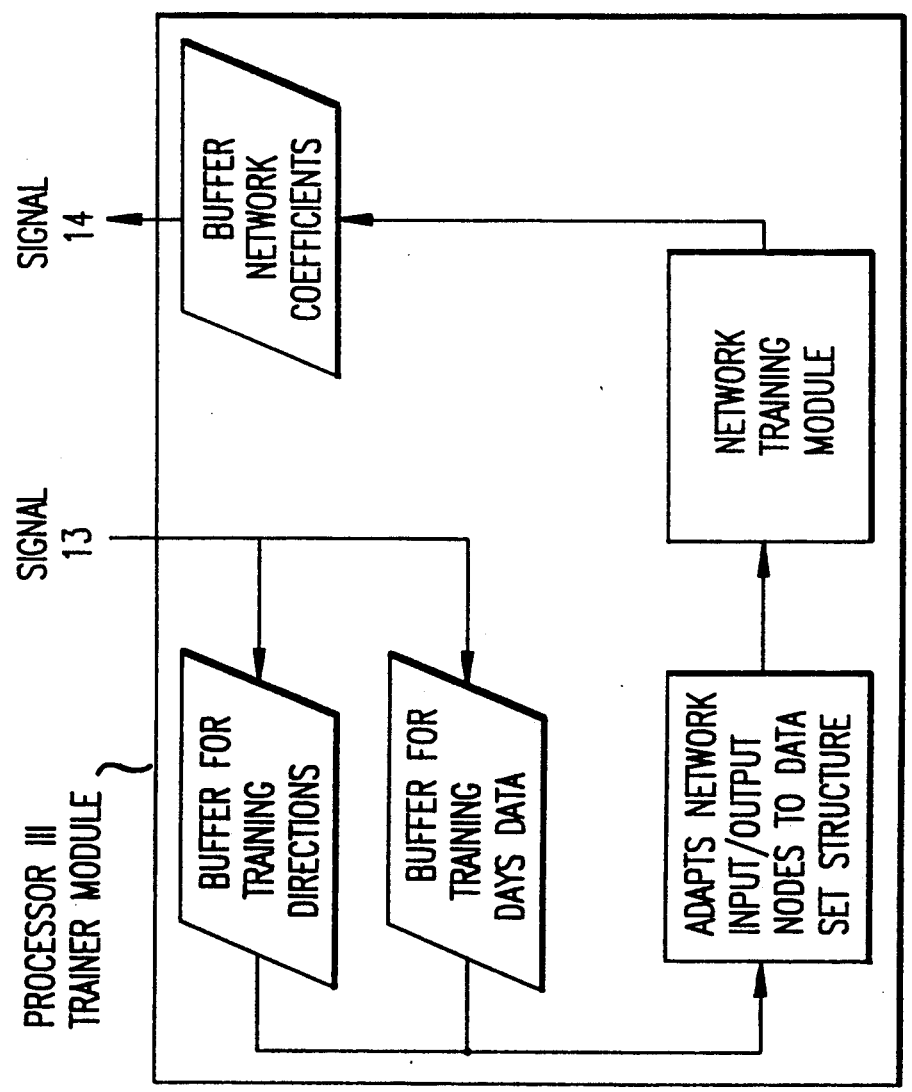
FIG. 5 shows a schematic of the trainer module, processor III.

The 'Trainer Module' is termed here 'processor III' and is shown in FIG. 5. Processor III operates on user instructions and on formatted data passed from processor II by signal 13. Processor III has one task: to train neural networks (i.e. create new correlation coefficients networks by means of training neural networks). The required neural network geometries are specified by the user or, by default, by the weather sensor measurement array (See FIG. 2) and by the short term prediction windows needed. By 'neural networks' is meant the generic type of adaptive system which, given input stimuli and output responses, minimizes differences between the given responses and network outputs to the given outputs (e.g. backpropagation, ART, RCE, forward-backward propagation, etc. are examples of the types that can be used.) The processor source code, according to a preferred embodiment of the invention, is written in Think C, a product of Symantic Corporation. In this embodiment described the lightning prediction system LightningLynx ™ (of KTAADN, Inc.) utilizes the neural network Lynx ™ (of James Bay, Inc.) and is used on the Macintosh ® (Macintosh is a registered trademark of the Apple Computer Corporation) computers of Apple Computer Corporation. For networks which are to be trained, processor III carries out a specification task that assigns the number and function of the neural network input and output node uses as shown in FIG. 12.

The 'Trainer Module' may incorporate a specially adaptive feature to expand or contract the input nodes of the correlation networks to be trained to fit the particular kinds of weather sensor outputs found at a particular site. The output of processor III is a trained correlation network (the final product of the neural network training) that is passed to processor IV by signal 14 together with sufficient information to identify its training data set, its training history and the testing data set required for evaluating the correlation network's performance.

Processor III has one type of input. This input, signal 13, passes the required neural network geometries, which are specified by the user or, by default, by the anemometer measurement array in FIG. 2, and by the short term prediction windows needed by processor III, see FIG. 5. Signal 13 may contain correlation networks which have not met the user's performance goals in the processor II testing procedure and which are returned to processor III for more training. The output of Processor III is a trained network with its training history and testing instructions contained in signal 14. These data and instructions are transmitted to the 'Trainer/Tester Control Module' described above.

Figure 6:
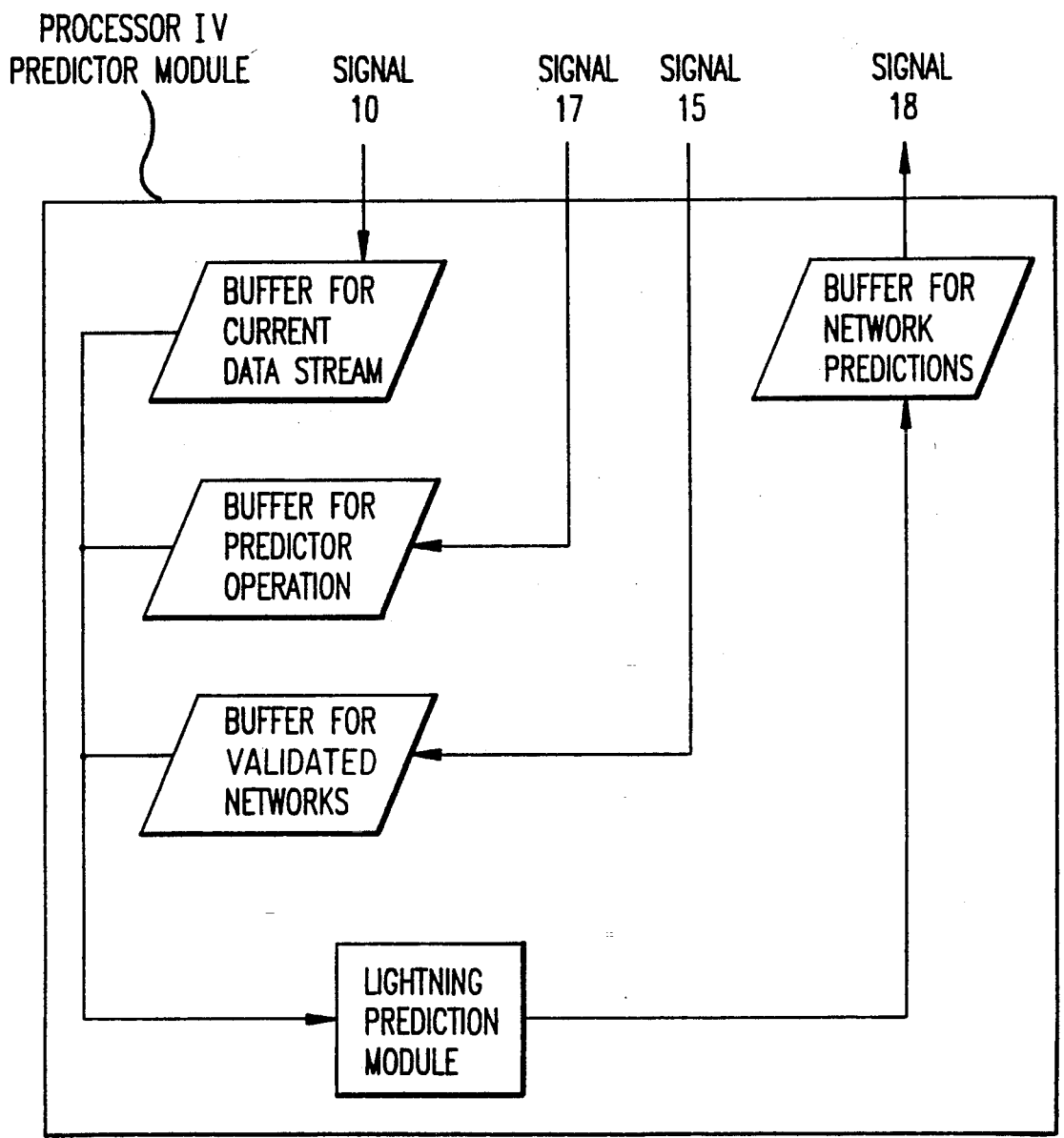
FIG. 6 shows a schematic of the predictor module, processor IV.
Figure 7:
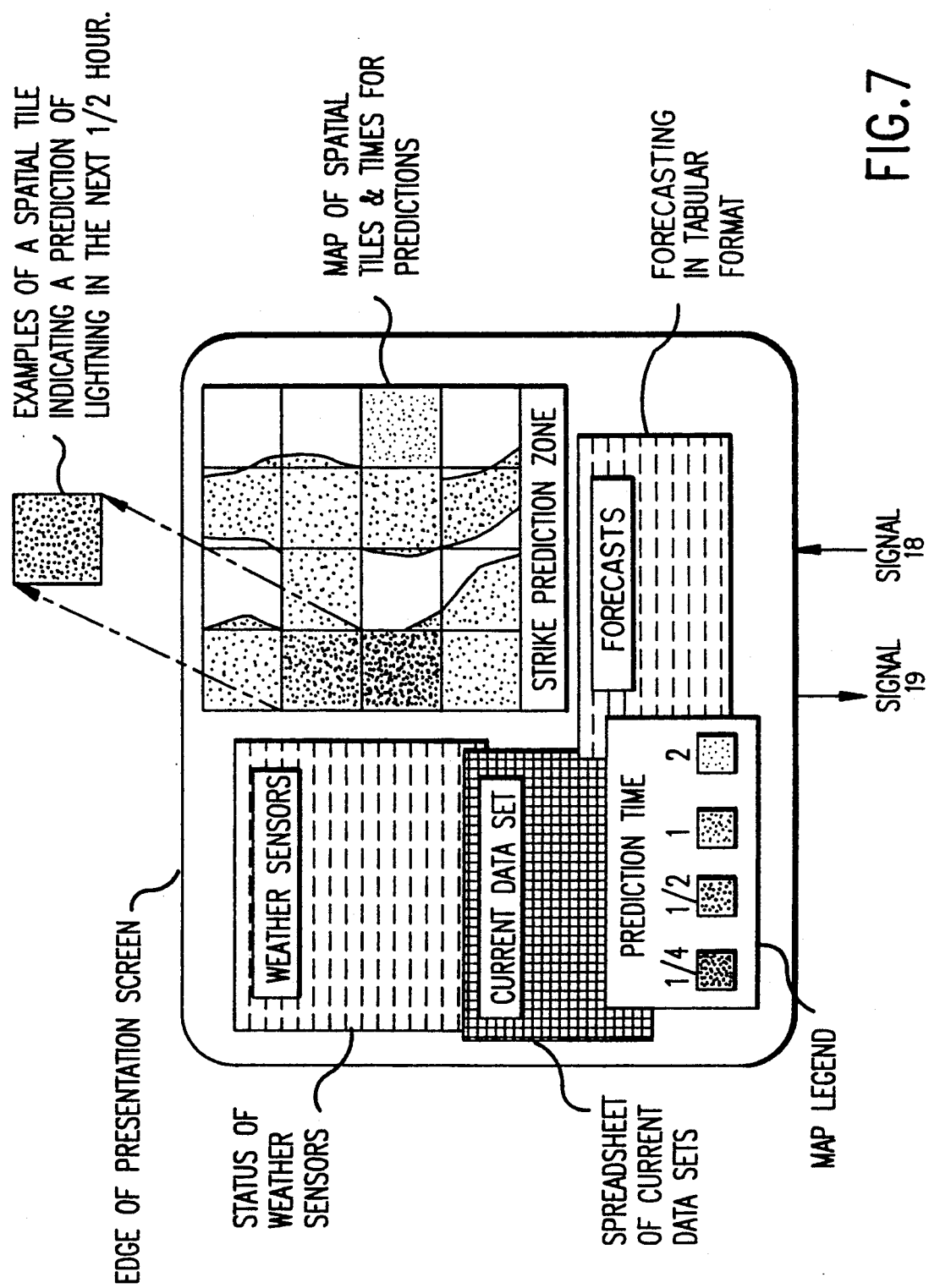
FIG. 7 shows an example of a display screen that may be generated by the invention.

The 'Predictor Module' is termed here 'processor IV' and is shown in FIG. 6. Processor IV has one task: to predict future strikes using the validated lightning-prediction-correlation coefficients provided by processor II. Processor IV operates on a trained and validated (i.e. one which has passed its performance goals) correlation network that has been passed from processor II by signal 15. The required prediction instructions (i.e. for period, area for prediction to apply, sets of data and presentation types) are passed from the user by signal 17. These instructions direct the required presentation factors needed to operate on the current weather sensor output provided from processor I via signal 10. Processor I receives its instructions for passing specific data to processor V from the user via signals 16 and 11 by way of processor II.

Processor IV has three types of input which are shown in FIG. 6. One input passes the required testing instructions from the user by signal 17. These instructions include information about the current data to be used and the types of prediction presentations needed. Another input passes a validated, trained network from processor II to processor IV in signal 15. The third type of input are the current, properly formatted weather data in signal 10. Processor IV has one type of output. Output signal 18 is the predictions on future lightning strikes in the targeted prediction area. These are passed onto the presentation monitor, processor V, which is described below.

The 'Presentation Module' is termed here 'processor V' and is shown in FIG. 7. Processor V has two principal functions. It presents predictions of lightning strikes as a function of time interval in the future and of spatial 'tile' (for a diagram of a spatial tile as used in the present invention, refer to FIG. 7) based upon the response of processor V to the currently measured weather. Processor V also allows the user to monitor the behaviors of processors I to IV and appropriately modify their behavior. An example was given with regard to the appearance of a failed network (as described above) can be stopped for a review of how to dispose of trained networks which do not pass the assigned performance goals. To do this task efficiently, this processor provides a monitor screen which allows the user to display one or more of a range of diagnostic windows. These include: data status, measurement instrument status, training status, testing results in several forms, and many detailed dialog boxes allowing the user to control the training, testing and prediction processes.

Processor V has one type of input. This input passes prediction results and presentation instructions from the user, via signal n through processor V, to create the required prediction presentations. Processor V has two types of output: visual displays and hardcopies of prediction results and the status of the predictor device. Schematics of the types of information available in the visual display are illustrated in FIG. 7. Output signal 18 is the predictions on future lightning strikes in the targeted prediction area. These are passed onto the presentation monitor, processor V, which is described below.

The present invention requires a particular 'utilization sequence' of operations for collecting data, formatting and storing data, training and testing (validating) predictor networks, production of predictions of lightning strikes and presentation of the predictions. This utilization sequence is implicit in the description of the invention given in this section.

The specific embodiment described above allows the user to set up an automatic prediction machine using currently measured weather parameters for further lightning strikes during the current day. It also allows the user to adapt to different local weather conditions to attain a desired level of lightning prediction performance. Preprocessor I utilizes wind vectors at time $t_0$ which may be combined with the surface wind vectors and their rates of change with time as measured at time $t_0$ and which may be further combined with the wind vectors, their rates of change for a series of previous times: $t_0$, $t_{31\ 1}$, $t_{-2}$, etc. The user will select which mode of inputs depending upon the difficulties of training an acceptable correlation network as determined by local weather and topography. The system allows the user to position the weather sensors (e.g. the surface wind vector sensors in one kind of layout) at their convenience without special regard to any resulting requirements for preprocessing or otherwise transforming the inputs to the present lightning predictor invention. The physical layout is composed of a field of J anemometers, K field mills, doppler radar surveys and so forth which provide surface wind vectors at J different locations. A location may be different either by its map coordinates (i.e. latitude and longitude) or its height above a stated map coordinates. A primary feature of the described embodiment is that, by using adaptive neural networks, the anemometer physical layout is not required to be regular (i.e. as on a grid) since the training cycle automatically adapts the lightning predictor to the differences in location. The critical task is to assure that the same physical layout is used during training, testing and routine prediction of lightning strikes. The system allows the user to adapt the predictor correlation network to the particular types of lightning phenomena kinds of weather sensors available at a particular site, and to train an automatic prediction for future lightning strikes during the current day without the use of conventional programming techniques and conventional programmer languages. This system also allows the user to obtain an automatic, quantitative scoring for the prediction performance of any predictive correlation network. This system also allows the user to retrain the network with newly collected data during periods in which predictions of future lightning strikes are not required.

What is claimed is:

1. A system for predicting the occurrence of lightning within a given area based on weather data collected and lightning occurrences detected during a plurality of past days and on weather data collected during the present day, the system comprising:
   collection means for collecting weather data;
   detection means for detecting the occurrence of lightning in the given area;
   correlation means, in communication with the collection means and the detection means, for determining correlations between the weather data collected by the collection means during a plurality of past days and the occurrence of lightning detected by the detection means during the plurality of past days in the given area; and
   prediction means, in communication with the collection means and the correlation means, for determining the probability of an occurrence of lightning in the given area at some future time, based on the weather data being collected during the present day and the correlations determined by the correlation means from the weather data collected on past days.

2. A system according to claim 1, wherein the collection means includes a plurality of anemometers for determining wind speed and direction, the anemometers being located at a plurality of locations.

3. A system according to claim 2, wherein the collection means further includes an electric field sensor for detecting the presence of a charged cloud.

4. A system according to claim 2, wherein the collection means further includes doppler radar for detecting precipitation.

5. A system according to claim 2, wherein the collection means includes an earth-orbiting satellite.

6. A system according to claim 2, wherein the collection means includes means for determining heights of nearby clouds and collecting data regarding the heights.

7. A system according to claim 1, wherein the detection means includes a plurality of direction-finding antennas for determining the location of lightning.

8. A system according to claim 1, wherein the collection means includes means for obtaining data regarding an overall pattern of weather.

9. A system according to claim 1, wherein the correlation means includes a neural network.

10. A method of operating a data processor to enable the data processor to predict the occurrence of lightning within a given area based on weather data collected and lightning occurrences detected during a plurality of past days and on weather data collected during the present day, the method comprising the steps of:
   collecting weather data;
   detecting the occurrence of lightning in the given area;
   storing information regarding weather data and lightning occurrences in a storage area of the data processor;
   determining and storing correlations between the weather data collected during a plurality of past days and the occurrence of lightning during the plurality of past days in the given area; and
   determining the probability of an occurrence of lightning in the given area at some future time, based on the weather data collected during the present day and the stored correlations.

11. A method according to claim 10, wherein the step of collecting weather data includes the steps of providing a plurality of anemometers for determining wind speed and direction, and locating the anemometers at a plurality of locations.

12. A method according to claim 11, wherein the step of collecting weather data includes the step of providing an electric field sensor for detecting the presence of a charged cloud.

13. A method according to claim 11, wherein the step of collecting weather data includes providing doppler radar for detecting precipitation.

14. A method according to claim 11, wherein the step of collecting weather data includes providing an earth-orbiting satellite.

15. A method according to claim 11, wherein the step of collecting the weather data includes the steps of determining heights of nearby clouds and collecting data regarding the heights of nearby clouds.

16. A method according to claim 11, wherein the step of detecting lightning includes providing a plurality of direction-finding antennas for determining the location of lightning.

17. A method according to claim 10, wherein the step of collecting the weather data includes the step of collecting data regarding an overall pattern of weather.

18. A system for predicting the occurrence of lightning in a given area based on weather data collected and lightning occurrences detected during a plurality of past days and on weather data collected during present day, the system comprising:
   collection means for collecting the weather data;
   detection means for detecting the occurrence of lightning in the given area and for recording data regarding when the lightning occurred;
   training means for receiving data from the collection means and from the detection means and for determining network coefficients, based on data regarding weather and lightning occurrences on past days received from the collection means and the detection means; and
   prediction means for receiving data from the collection means and the network coefficients from the training means and for predicting the occurrence of lightning, based on data received from the collection means and the network coefficients received from the training means.

19. A system according to claim 18, wherein the collection means includes a plurality of anemometers for determining wind speed and direction, the anemometers being located at several locations.

20. A system according to claim 19, wherein the collection means further includes an electric field sensor for detecting the presence of a charged cloud.

21. A system according to claim 19, wherein the collection means further includes doppler radar for detecting precipitation.

22. A system according to claim 19, wherein the collection means includes an earth-orbiting satellite.

23. A system according to claim 19, wherein the collection means includes means for determining heights of nearby clouds and collecting data regarding the heights.

24. A system according to claim 19, wherein the detection means includes a plurality of direction-finding antennas for determining the location of lightning.

25. A system according to claim 18, wherein the collection means includes means for obtaining data regarding an overall pattern of weather.

26. A method of operating a data processor to enable the data processor to predict the occurrence of lightning in a given area during a day based on weather data collected and lightning occurrences detected during a plurality of days and on weather data collected during the day, the method comprising:
   collecting weather data over a plurality of days and storing in a storage area of the data processor information regarding the weather data collected over the plurality of days;
   detecting the occurrence of lightning in the given area during the plurality of days, generating data regarding when the lightning occurred and storing information regarding lightning occurrences in a storage area of the data processor;

determining and storing in a storage area of the data processor network coefficients, based on the stored data regarding weather and lightning occurrences on the plurality of days;

collecting weather data during the day and storing in a storage area of the data processor information regarding the weather data collected during the day;

determining the probability of lightning occurring in the given area, based on stored data collected during the day and the network coefficients.

27. A system for predicting the occurrence of lightning within a given area and within a given timeframe based on weather data collected and lightning occurrences detected during a plurality of past days and on weather data collected during the present day, the system comprising:

collection means for collecting weather data within and outside of the given area;

detection means for detecting the occurrence of lightning within the given area and for recording data regarding when the lightning occurred;

training means for receiving data from the collection means and from the detection means and for determining network coefficients, based on data regarding weather and lightning occurrences on past days received from the collection means and the detection means; and prediction means for receiving data from the collection means and the network coefficients from the training means and for predicting the occurrence of lightning within the given area, based on data received from the collection means and the network coefficients received from the training means.

28. A system for predicting the occurrence of lightning in a plurality of given areas and within a plurality of given timeframes based on weather data collected and lightning occurrences detected during a plurality of past days and on weather data collected during the present day, the system comprising:

collection means for collecting weather data within and outside of a given area;

detection means for detecting the occurrence of lightning within the given area and for recording data regarding when the lightning occurred;

training means for receiving data from the collection means and from the detection means and for determining network coefficients, based on data regarding weather and lightning occurrences on past days received from the collection means and the detection means; and prediction means for receiving data from the collection means and the network coefficients from the training means and for determining when lightning is likely to occur within the given area, based on data received from the collection means and the network coefficients received from the training means.

* * * * *